Figure 1:
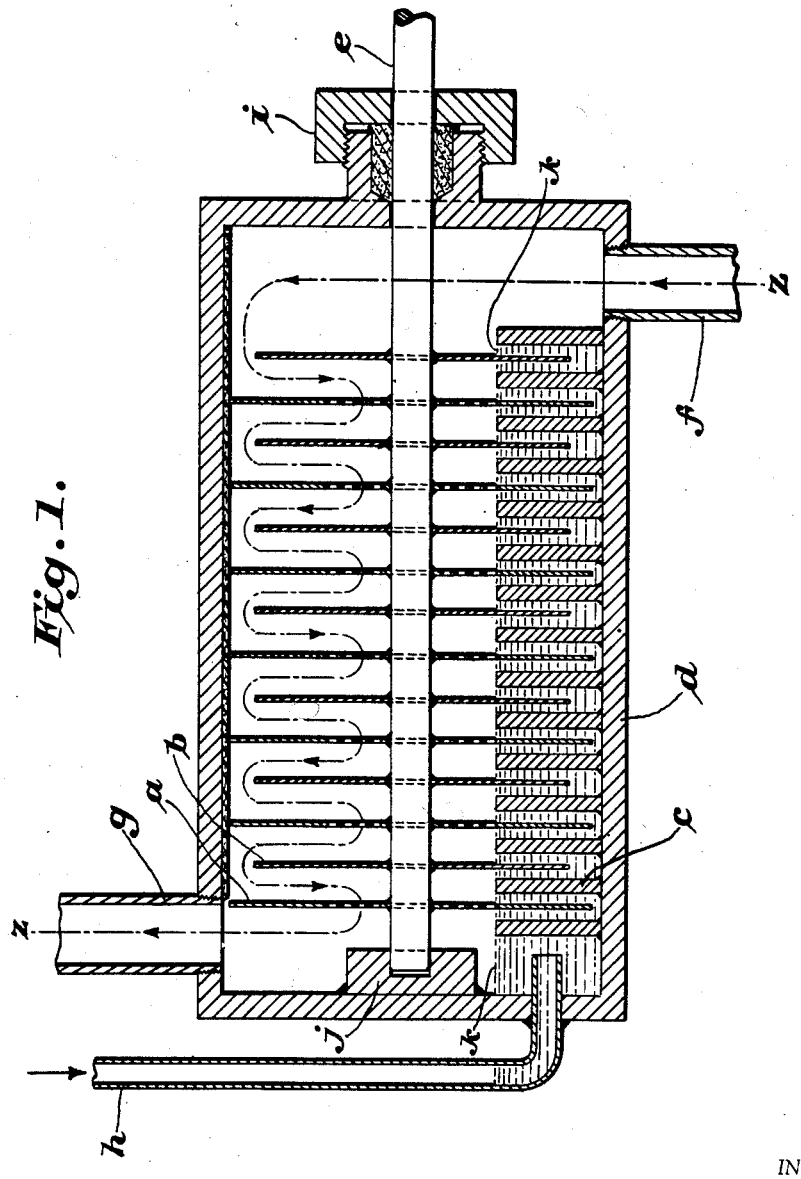

Dec. 28, 1954   C. H. BOWDEN ET AL   2,698,287
ROTARY FRACTIONATION APPARATUS
Filed March 1, 1951   2 Sheets-Sheet 1

INVENTORS:
Cyril Henry Bowden,
Edward Vincent Cooke,
BY Cushman, Darby & Cushman
ATTORNEYS.

Dec. 28, 1954  C. H. BOWDEN ET AL  2,698,287
ROTARY FRACTIONATION APPARATUS
Filed March 1, 1951  2 Sheets-Sheet 2
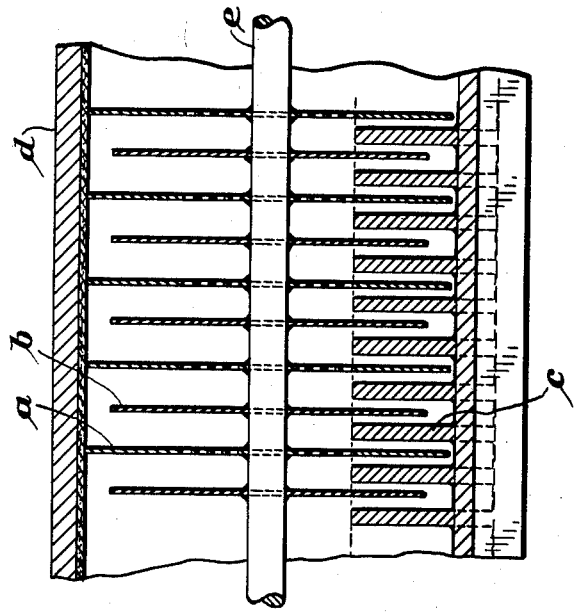
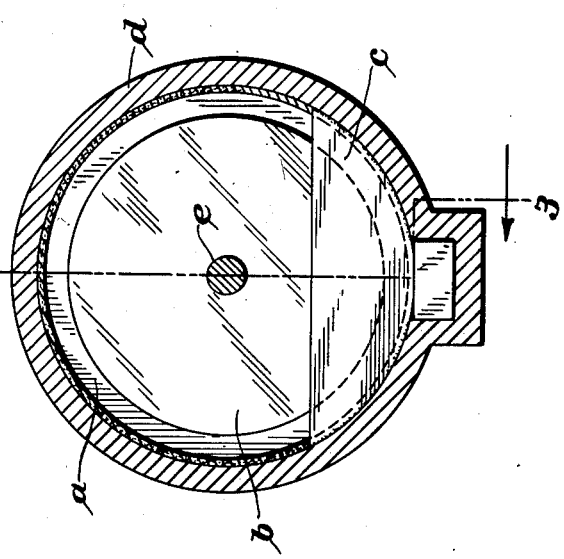
INVENTORS:
Cyril Henry Bowden,
Edward Vincent Cooke,
BY Cushman, Darby & Cushman
ATTORNEYS.

United States Patent Office 2,698,287
Patented Dec. 28, 1954

2,698,287

ROTARY FRACTIONATION APPARATUS

Cyril H. Bowden and Edward V. Cooke, Manchester, England, assignors to Imperial Chemical Industries Limited, a corporation of Great Britain Application March 1, 1951, Serial No. 213,384

Claims priority, application Great Britain March 3, 1950

3 Claims. (Cl. 202—158)

The present invention is of a device useful for the fractionation of liquids.

According to the invention we provide a device useful for the fractional distillation of liquids comprising a cylindrical vessel provided with openings, one at each end, for the entry and exit of vapour, and with a coaxially rotatable member, said rotatable member being fitted radially with a number of discs, i. e. circular plates or the like structures, which extend to the periphery of the cylindrical vessel, and which have holes in the area adjacent to the rotating member, and said rotating member having also fitted thereto alternately, and so in between each pair of the larger discs, a series of unperforated discs which do not extend to the periphery of the said cylindrical vessel.

The rotatable member may be conveniently a shaft. The discs which extend to the periphery of the cylindrical vessel, and which contain an annular hole or annularly arranged holes or perforations in the area adjacent to the member may be composed at least in their central area and at least in part, of wire gauze which also may contain holes.

The discs of either kind may be attached to the rotatable member directly or may be attached by use of spacing collars fitted on the member, which for the purpose is conveniently in the form of a shaft. These spacing collars may, if desired, be shaped in order to cause the flow of vapour, as it turns from a radial direction inwards to a radial direction outwards, to be free from eddies.

The device is to be understood as for use with the axis of the cylindrical vessel horizontal, or approximately so.

Optionally, in what, in such a position, can be referred to as the bottom of the cylindrical vessel, i. e. the trough-like, lower part, there may be, between each pair of said rotatable discs, plates in the form of segments of circles with the chord horizontal, attached to the periphery of the cylindrical vessel so as to hold in the vessel a constant volume of liquid. This total volume is preferably diminished as much as possible; hence, these plates are advantageously of substantial thickness so as to minimise as indicated the amount of liquid held in the cylindrical vessel during a fractional distillation operation and retained at the end thereof. Also with minimum amount of liquid there is better fractionation because each pool is agitated more thoroughly.

These segment-like plates are conveniently of such a height measured from the bottom to the chord that the line of the chords intercepts the circles which represent the peripheries of the unperforated discs, the aim being to provide a meandering passage for vapour, which passes along barriers the surfaces of which are wet with liquid.

The device, as will be understood, is connected at the one end with a boiler, and at the other end with a condenser, as necessary via a dephlegmator. It will be understood that these connections may be of any desired and appropriate form and shape and that the one housing may be such as to provide for dispensing with, or reducing to a minimum, connecting pipes, flanges and such like fitments.

Such a device is adapted to batchwise distillation; for continuous distillation purposes appropriate inlets and outlets provided with valves are made in the wall at the bottom of the cylindrical vessel so that liquid may be fed into or removed from any compartment of the trough-like portion.

The accompanying drawing Fig. 1, illustrates a cross-section of a particular form of the device. Figure 2 is a transverse sectional view of a modification of the device shown in Figure 1 and Figure 3 is a longitudinal cross-sectional view of a portion of the device of Figure 2 taken on the lines 3—3 in Figure 2. In the drawing $a$ is one of a series of perforated discs which extend to the periphery of the vessel, $b$ is one of a series of non-perforated discs which do not extend to the periphery of the vessel, $c$ is one of a series of segment-like plates attached to the lowermost portion of the periphery of the vessel, $d$ is the casing of the cylindrical vessel, $e$ is a rotatable shaft to which the discs are attached, $f$ is an opening whereby vapours from a boiling vessel may enter the cylindrical vessel, $g$ is an opening whereby the vapours passing through the device may leave the vessel, $h$ is a pipe whereby part of the liquid condensed from the vapours leaving the vessel may be returned to the vessel, $i$ is a gland, $j$ is a bearing, and $kk$ represents the level of the liquid retained in the vessel when it is being used for fractionating a liquid.

The means of attaching the discs $b$ to the rotating member and of attaching the segment-like plates $c$ to the periphery of the vessel are such that liquid tight unions are provided.

In the operation of the particular form of the device as illustrated in Fig. 1, the rotatable member is rotated slowly, the vapours from the liquid to be fractionated are passed into the vessel through the opening $f$, the vapours pass through the device in the manner indicated by the dotted line $zz$, leaving the vessel through the opening $g$, and pass into a condenser via a dephlegmator of any conventional type, so arranged that a portion of the condenser liquid is returned to the vessel through the pipe $h$. When the device has been operating in this way for a short time, the level of the liquid in the vessel rises to that indicated by the dotted line $kk$, and, thereafter, liquid passes out of the vessel through the opening $f$ at a rate approximating to the rate at which it is returned to the vessel through the pipe $h$.

The segment-like plates ($c$) may be inserted and fixed in various ways, apparent to any person skilled in the engineering art. By way of indication it will be said that an arc-like recess may be provided in the wall of the cylinder into which the plates suitably provided with spacing blocks may be packed synchronously with the insertion of the rotatable member, carrying the discs, into the cylinder. Or the cylinder may be provided, along its bottom, with a projecting gully or channel of suitable shape into which the segment-like plates, each provided with an ear to correspond, and with spacing blocks, may be packed and fixed by screws. Such a constructional arrangement is shown in Figs. 2 and 3.

Any suitable materials may be used in the construction of the device. It will be understood that for many purposes some form of what is colloquially known as "stainless steel" is a very suitable material.

The surfaces of the discs may advantageously be made rough or irregular so as to increase the area of wettable surface and to promote turbulence in the vapour stream passing near it. A convenient method of so modifying the surface is to cut, by means of a lathe, a spiral groove thereon.

By way of example, to illustrate working of the device the figures below are given. These relate to a particular embodiment of the invention in which the cylindrical vessel is 8″ in internal diameter and contains 25 discs of each kind, so, in all, 50 discs spaced $\tfrac{3}{16}$″ apart.

Operated under conditions of total reflux with a mixture of o-xylene and p-xylene under a pressure of 400 mm. mercury, the composition of the liquid at the two ends corresponds with the separation equivalent to 7.6 transfer units as calculated according to the directions given by Walker, Lewis, McAdams and Gilliland in "Principles of Chemical Engineering," 3rd edition, New York, 1937, on page 490, and also by Chilton and Colburn in "Industrial and Engineering Chemistry," 1935, 27, at page 255. The separation thus indicated is substantially independent of rate of through-put. The pressure difference between the ends varies according to rate of through-put. It is 0.023 mm. mercury at 4 lb. per hour through-put, and 2.7 mm. mercury at 35 lb. per hour through-put.

In another embodiment of the invention, with the discs 1/8" apart but otherwise as described above a separation of o-xylene from p-xylene represented by 5.6 transfer units is obtained. In this embodiment pressure drop varies as the square of the mass through-put and inversely as the so-called absolute pressure, as is shown in this table:

| Abs. pressure, mm. Hg | Pressure Drop, mm. Hg | Throughout rate, lb. per hour |
|---|---|---|
| 25 | 0.37 | 4 |
| 25 | 1.5 | 8.3 |
| 100 | 0.28 | 6.8 |
| 100 | 2.2 | 19 |
| 200 | 0.94 | 17 |
| 200 | 1.6 | 22 |
| 400 | 0.21 | 11 |
| 400 | 3.3 | 45 |

For comparison a vertical column, packed with 1/2" or 1" Raschig rings, and of a height to provide an equivalent number of transfer units has, at 760 mm. of mercury absolute pressure a pressure drop of 20 or 14 mm. of mercury just below the flooding point, and of 5 mm. or 3 mm. of mercury at the minimum value of pressure drop per transfer unit at low rate of through-put, as can be seen on page 828 of Perry's "Chemical Engineers' Handbook," 2nd edition, New York, 1941, or in the article by Furness and Taylor in Transactions of the American Institution of Chemical Engineers, 1940, 36, page 135.

The device is compact and accordingly there is a saving of working space, and only a simple supporting structure is needed. Moreover, the surface to be lagged is, for the same fractionating efficiency, much less than that to be lagged in the usual kind of upright fractionating column. When the device is in work there is a low pressure drop and a low liquid hold-up. As compared with other fractionating devices, its efficiency is high especially at low rates of through-put. It can accordingly be used to advantage in fractional distillation of liquids at low pressure, e. g. at pressures of ten millimetres of mercury or below.

The device is useful also in two-phase counter current operations other than those of fractional distillation. That is to say it can be used for treating gas with liquid or vice versa or in the extraction of one liquid with another in which it is immiscible.

We claim:

1. A fractional distillation device in which vapors from a boiling mixture of liquids are fed into the device, vapors emerging from the device are condensed and a portion of the condensate is returned to the device as reflux and the uncondensed vapors withdrawn from the device which comprises, an approximately horizontally positioned closed cylindrical vessel having an outwardly extending recess in its lowermost portion, said vessel being provided with an entry port at one end thereof for supplying vapors to the cylindrical vessel, an exit port on the upper side of the opposite end thereof through which the uncondensed vapors can be withdrawn, means for returning condensate to said vessel on the same end of said vessel as said exit port, and means for withdrawing condensate from the same end of said vessel as said inlet port, a rotatable member along the central longitudinal axis of the vessel, said member having a plurality of discs attached thereto, alternate discs being of the same diameter as the internal diameter of the vessel and extend to the periphery of the cylindrical vessel except in the area of the recessed portion and being perforated in the area adjacent to the rotatable member so that the vapor passing through said vessel is forced through said centrally located perforations, the other discs being of sufficient diameter to extend beyond said centrally located perforations but smaller than the internal diameter of the vessel so that the vapor supplied to said cylindrical vessel traverses said vessel longitudinally in a meandering path which leads back and forth between the space between the vessel wall and the smaller discs and the centrally located perforations in the larger discs, said vessel being provided with a plurality of longitudinally spaced segmental partitions in its lowermost portion which divide the outwardly extending lowermost portion of said vessel into a plurality of longitudinally spaced liquid-tight receptacles into which said discs dip so that the returned condensate is longitudinally confined in said receptacles whereby said discs as they are rotated by said rotatable member deposit the liquid condensed thereon in said receptacles and pick up fresh liquid which is enriched in the lower boiling components of the mixture of liquids fed to the device, said segmental partitions and said outwardly extending lowermost portion of said vessel functioning to enable returned condensate to successively overflow said partitions and flow past said larger discs to longitudinally traverse said lowermost portion of said vessel in a direction counter-current to the passage of vapor through said vessel while being temporarily retained in each succeeding receptacle where the lower boiling components of said condensate are progressively removed.

2. A fractional distillation device as recited in claim 1 in which said means for returning condensate to said vessel comprises a second inlet port.

3. A fractional distillation device as recited in claim 2 in which the surfaces of the discs are roughened.

References Cited in the file of this patent

UNITED STATES PATENTS

| Number | Name | Date |
|---|---|---|
| 447,258 | Patten | Feb. 24, 1891 |
| 701,619 | Riecke | June 3, 1902 |
| 1,838,009 | Strecker | Dec. 22, 1931 |

FOREIGN PATENTS

| Number | Country | Date |
|---|---|---|
| 5,113 | Great Britain | of 1895 |
| 456 | Denmark | Mar. 14, 1896 |
| 201,568 | Germany | Sept. 27, 1906 |
| 269,790 | Great Britain | Apr. 28, 1927 |
| 121,098 | Switzerland | June 16, 1927 |
| 41,697 | Denmark | Feb. 23, 1928 |
| 408,016 | Great Britain | Apr. 5, 1934 |